United States Patent [19]

Eaton, Jr. et al.

[11] Patent Number: 5,104,293
[45] Date of Patent: Apr. 14, 1992

[54] METHOD FOR APPLYING ABRASIVE LAYERS TO BLADE SURFACES

[75] Inventors: Harry E. Eaton, Jr., Woodstock, Conn.; Matthew J. Wallace, Palm Beach Gardens, Fla.

[73] Assignee: United Technologies Corporation, Hartford, Conn.

[21] Appl. No.: 553,057

[22] Filed: Jul. 16, 1990

[51] Int. Cl.$^5$ ............................ B63H 7/02; F01D 5/14
[52] U.S. Cl. ................................ 416/241 B; 416/224; 416/229 A; 29/527.2; 29/527.4; 29/889.7
[58] Field of Search ............... 416/241 B, 224, 229 A; 29/889.7, 889.71, 527.2, 527.4; 427/34, 423

[56] References Cited

U.S. PATENT DOCUMENTS

| | | | |
|---|---|---|---|
| 3,607,343 | 9/1971 | Longo | 427/423 X |
| 4,101,715 | 7/1978 | Rairden | 427/34 X |
| 4,275,090 | 6/1981 | McComas et al. | 427/34 |
| 4,291,089 | 9/1981 | Adamovic | 427/423 X |
| 4,370,789 | 2/1983 | Schilke et al. | 427/34 X |
| 4,386,112 | 5/1983 | Eaton et al. | 427/34 |
| 4,449,989 | 5/1984 | Sarin et al. | 51/295 |
| 4,469,489 | 9/1984 | Sarin et al. | 51/295 |
| 4,550,063 | 10/1985 | Galasso et al. | 428/614 |
| 4,576,828 | 3/1986 | Walker, Jr. | 427/34 |
| 4,610,698 | 9/1986 | Eaton et al. | 51/295 |
| 4,629,707 | 12/1986 | Wolfe | 501/97 |
| 4,670,024 | 6/1987 | Bhat et al. | 51/295 |
| 4,741,973 | 5/1988 | Condit et al. | 428/553 |
| 4,744,725 | 5/1988 | Matarese et al. | 415/172 A |
| 4,802,828 | 2/1989 | Rutz et al. | 416/241 B |
| 4,851,188 | 7/1989 | Schaefer et al. | 29/889.71 X |
| 4,884,820 | 12/1989 | Jackson et al. | 416/241 B X |

FOREIGN PATENT DOCUMENTS

| | | |
|---|---|---|
| 0185224 | 6/1986 | European Pat. Off. . |
| 0210614 | 2/1987 | European Pat. Off. . |
| 0219885 | 4/1987 | European Pat. Off. . |
| 0287370 | 10/1988 | European Pat. Off. ............ 29/889.7 |
| 59-232970 | 12/1984 | Japan . |
| 0106964 | 6/1985 | Japan .................................. 427/250 |
| 61-191564 | 8/1986 | Japan . |
| 61-191565 | 8/1986 | Japan . |
| 1210170 | 9/1986 | Japan .................................. 427/34 |
| 0241807 | 10/1987 | Japan .................................. 427/34 |
| 2158160 | 11/1985 | United Kingdom . |

OTHER PUBLICATIONS

H. E. Eaton and R. C. Novak "Coating Strength of Plasma Sprayed Stainless Steel"–Surface & Coatings Technology, 27, (Sep. 1986) 197–202.

Alan Arias "Effect of Yttria Additives On Properties of Pressureless-Sintered Silicon Nitride" NASA Technical Paper May 1989.

Gerald Q. Weaver & John W. Lucek "Optimization of Hot-Pressed Silicon Nitride Yttria Materials"–Ceramic Bulletin, vol. 57, #12 (Oct. 1978).

R. K. Govila "Strength Characterization of Yttria/Alumina-Doped Sintered Silicon Nitride"–5-7–Ceramics, vol. 108, Jun. 1988 (108: 117447r).

Primary Examiner—Edward K. Look
Assistant Examiner—Todd Mattingly
Attorney, Agent, or Firm—James M. Rashid

[57] ABSTRACT

This invention relates to abrasive layers for use in the gas turbine industry. The preferred embodiment of the invention comprises nickel coated, yttria doped silicon nitride particulates dispersed within a nickel base superalloy matrix which is substantially free of oxides. The layer is formed using low pressure plasma spray processes.

14 Claims, 2 Drawing Sheets

METHOD FOR APPLYING ABRASIVE LAYERS TO BLADE SURFACES

TECHNICAL FIELD

This invention relates to methods for applying an abrasive layer to the surface of a gas turbine engine component.

BACKGROUND

U.S. Pat. No. 4,386,112 to Eaton et al. describes a method and apparatus for applying an abrasive layer onto the surface of a metal gas turbine engine blade. The layer comprises silicon carbide (SiC) particles in a metal matrix which contains nickel, about 15-22% chromium and about 4-8% aluminum (NiCrAl). The layer is applied by injecting SiC particles and NiCrAl powder particles into a conventional plasma spray stream. The SiC particles are injected into the plasma stream at a location axially downstream of the location at which NiCrAl powder particles are injected into the stream. As is typical of plasma spray processes, the plasma stream heats the particles, and impacts them upon a substrate, thereby forming an abrasive coating layer on the substrate.

Eaton et al. stresses that the injection location of the ceramic and metal powder particles into the spray stream is of critical importance in the fabrication of the abrasive coating layer. According to Eaton et al., the residence time of the ceramic particles stream must be short, otherwise the angular cutting edges on the ceramic particles will be destroyed. Furthermore, the ceramic particles must be injected into the spray stream at a location which is close to the substrate, in order to minimize acceleration of the ceramic particles by the stream. If the velocity of the ceramic particles is too high, the particles bounce off the substrate as they strike it. In the examples discussed in Eaton et al., the axial distance between the substrate and the location at which the ceramic particles are injected into the spray stream is about 1.5 millimeters (mm), while the distance between the substrate and the location at which the metal particles are injected into the spray stream is about 60 mm.

The coating layer formed using the procedures by Eaton et al. comprises a plurality of individual layers of the ceramic and metal; the metal acts as a matrix which secures the ceramic particles within the layer. Each layer of metal is separated from adjacent layers by oxide films. Such films are a direct result of the spray application of the NiCrAl alloy powder using conventional plasma spray techniques, i.e., in an air atmosphere.

Coatings produced in accordance with Eaton et al. have a maximum use temperature of about 540° C. Above such temperatures, the matrix material undergoes substantial oxidation, and mechanical properties such as creep strength are degraded; furthermore, a solid state reaction takes place between the matrix and the SiC particles which significantly degrades the properties of the layer.

Notwithstanding the benefits associated with the development of coatings such as those described by Eaton et al., they have significant limitations; for example, they are not suited for use in the turbine section of an aircraft gas turbine engine. Accordingly, the industry continues to search for a combination of matrix material and abrasive material which have substantially better properties than those described by Eaton et al. Such properties include oxidation resistance, high temperature strength, high temperature abrasiveness, and chemical stability.

SUMMARY OF THE INVENTION

According to this invention, an abrasive layer is applied to the surface of a gas turbine blade by a method which includes the steps of generating a nonoxidizing plasma stream and directing the stream onto the blade surface through the downstream end of a plasma spray nozzle; injecting ceramic and metal particles into the stream at a location which is upstream of the nozzle end, such that the particles mix in the stream and are heated and impacted upon the surface. The ceramic particles are SiAlON or crystalline $Si_3N_4$ coated with a thin layer of nickel, cobalt, or an alloy of nickel or cobalt; and the metal particles have a composition consisting essentially of, by weight percent, 0-10Co, 6-10Cr, 5-10Al, 4-10W, 2.25-8Ta, 0-1Hf, 0.1-0.2Y, 0.015-0.025C, 0-2Mo, 0-3Re, balance nickel.

The layer of this invention is characterized by about 5-30 volume percent ceramic particulates distributed through the metal alloy matrix and is substantially free of oxidized matrix metal. The layer is about 125-375 microns thick.

Components made in accordance with the invention are capable of operating at high temperatures without failure, and consistently cut grooves in metallic as well as ceramic seals. The abrasive layers of this invention are superior to prior art layers in terms of performance, fabricability, and cost. Other objects, features and advantages of the invention will become more apparent in light of the following detailed description of the preferred embodiment thereof as shown in the accompanying drawing.

BEST MODE FOR CARRYING OUT THE INVENTION

Figure 1:
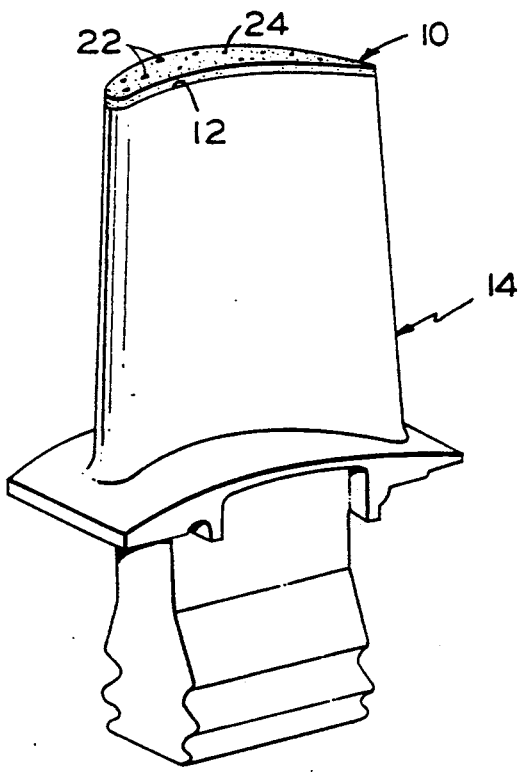
FIG. 1 is a perspective view of a turbine blade having a abrasive layer according to this invention.

Abrasive layers in accordance with this invention are particularly suited for use on the tip surface of blades which operate in the turbine section of aircraft gas turbine engines. In FIG. 1, the abrasive layer 10 is shown on the tip surface 12 of turbine blade 14. The layer comprises abrasive particles 22 dispersed in a metal matrix 24. Such blades rub stationary seal members which are fabricated of either metals or ceramics. Other uses in environments characterized by high temperatures and high stresses will be apparent to those skilled in the art.

The thickness of the abrasive layer of this invention is between 125 and 375 microns, preferably about 250 microns. The ceramic material used as the abrasive particulate has high temperature strength and stability, and is chemically inert (i.e., is nonreactive with the metal matrix within which it is disposed and with the seal member it contacts) during use. The metal matrix is oxidation resistant and has high strength, in particular, good creep strength at temperature.

Figure 2:
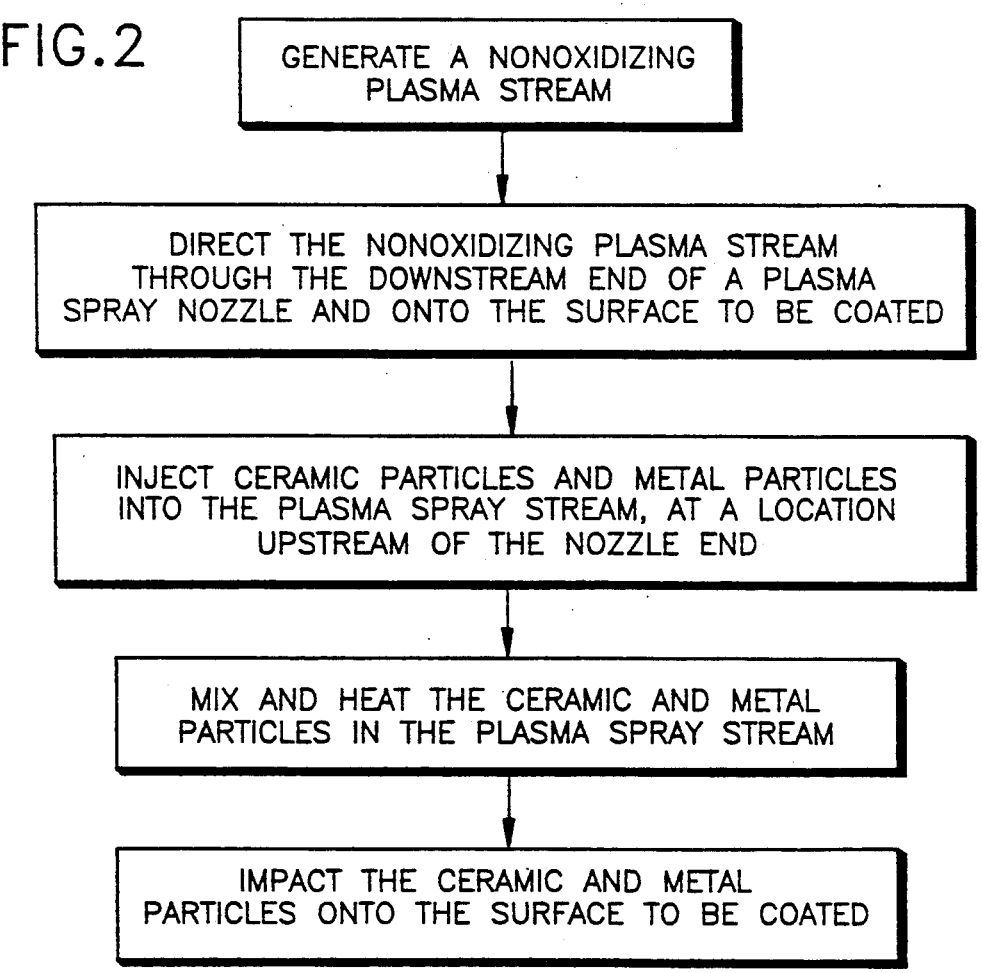
FIG. 2 is a block diagram showing the details of the method of the present invention.
Figure 3:
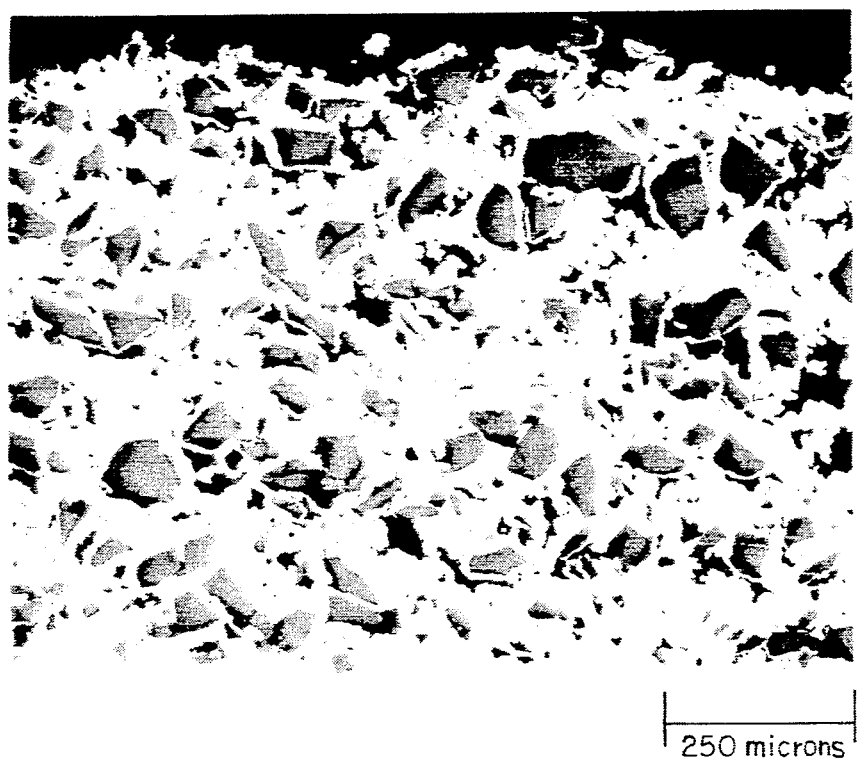
FIG. 3 is a photomicrograph showing the inventive abrasive layer in a cross sectional view.

Abrasive layers in accordance with this invention are fabricated using plasma spray techniques which heat and propel a mixture of ceramic and metal particles in a nonoxidizing environment onto the surface of a substrate, as shown in the block diagram of FIG. 2. The need for a nonoxidizing environment is a key aspect of the invention, and one of the major reasons for the superior properties of the invention layer.

The preferred means for applying the abrasive layer is with a low pressure plasma spray (LPPS) system, such as the type sold by Electro Plasma, Inc. of Irvine, Calif. U.S.A. LPPS systems provide an atmosphere characterized by a very low partial pressure of oxygen, which results in a nonoxidizing environment during the spray process. The LPPS spray gun generates a high temperature, high velocity, nonoxidizing stream of gas into which the ceramic and metal particles are injected, and produces sprayed deposits which are oxide free and nearly fully dense.

Other types of plasma spray systems may also be used in carrying out this invention as long as they provide a nonoxidizing environment for the spray process. Such systems include those in which the plasma stream and substrate are blanketed with an inert gas atmosphere during the spray process. An example of this type of spray system is sold by the Union Carbide Corporation of Indianapolis, Ind. U.S.A., and is referred to in the industry as an argon-shroud system.

The plasma spray system should include separate powder feeders for introducing the ceramic and the metal particles into the plasma spray stream. There should be at least one feeder which introduces ceramic particles into the spray stream and another feeder which introduces metal particles into the spray stream. The use of such dedicated powder feeders allows the operator of the spray system to precisely control the amount of ceramic and metal particles in the sprayed layer, and therefore, control the properties of the layer.

The ceramic and metal particles are injected into the spray stream in a manner distinguished from the prior art. The stream is directed onto the blade surface through the downstream end of a nozzle on the plasma gun. Ceramic and metal particles are injected into the stream at a location upstream of the nozzle end such that the particles mix in the stream and are heated and impacted upon the blade surface. The ceramic and metal particles are introduced into the stream at similar axial and radial positions with respect to the axis of the stream. The ceramic particles are introduced through the nozzle and into the stream at an angle of about 10°-20° with respect to the stream axis; the metal particles are introduced into the stream at an angle of about 10°-20° with respect to a line which is normal to the stream axis. Such orientations of the ceramic and metal powder ports promotes mixing of the particles in the spray stream, which has been determined to produce better quality sprayed deposits, as compared to spray systems where there is little or no mixing of the particles in the stream.

One of the major reasons for the superiority of the inventive layer compared to prior art layers relates to the materials which are used. The ceramic constituent in the abrasive layer of this invention has several key properties. First, the ceramic is abrasive, and it retains such abrasive characteristics even when used at very high temperatures. Furthermore, the ceramic is inert with respect to the matrix material within which it is dispersed as well as the seal material it is designed to rub against; in other words, it does not react chemically with the matrix or with the seal. Finally, the ceramic is in a form which allows it to be plasma sprayed. In particular, the ceramic particles have a size which allow them to be efficiently directed from a powder feeder, into the plasma spray stream and onto the blade surface; it also has characteristics which allow it to adhere to the substrate it is sprayed upon.

The ceramic constituent of the inventive layer is selected from the group consisting of $Si_3N_4$ and SiAlON. Both of these ceramics are excellent abrasives and are chemically inert with metal matrices and metal seal materials. The inert nature of these ceramics is observed at temperatures as high as about 1,100° C. for periods of time up to at least 500 hours. The preferred ceramic is polycrystalline beta-$Si_3N_4$ characterized by crystalline silicate precipitates at the grain boundaries; amorphous and glassy silica at the grain boundaries should minimized. Oxides such as yttrium oxide and aluminum oxide are best able to form crystalline silica grain boundary phases; crystalline yttria silicates at the $Si_3N_4$ grain boundaries are most preferred, and form in the presence of about 2-15 weight percent yttria. The most preferred crystalline $Si_3N_4$ ceramic is sold under the trademark Iscanite ® abrasive by Iscar Ceramics, Inc., Livonia, Mich. U.S.A. The ceramic particulates used in carrying out the invention should have a nominal diameter between about 50 and 175 microns. Mesh sizes of such particulates range from −270 to +400 mesh (for nominal 50 micron particulates) to −70 to +100 mesh (for nominal 175 micron particulates). Two size ranges are preferred: (1) +170 to −270 mesh and (2) +120 to −170 mesh.

The abrasiveness of the layer formed in accordance with this invention is a function of the volume percent of ceramic particulate in the layer. The preferred range of ceramic is about 5-40 volume percent. Under 5 volume percent ceramic, the layers do not have adequate abrasive characteristics; layers which have more than 40 volume percent abrasive cannot be fabricated in a manner which provides a dense metal matrix. The most preferred amount of ceramic is about 15-25 volume percent.

The surface of the ceramic particles should be treated to enhance their ability to adhere to the blade surface during the spray process. The preferred method by which the ceramic particles are treated is by coating them with a thin layer of metal prior to plasma spraying. Ceramic particles coated with a layer of metal between 4 and 40 microns thick adhere substantially better to metal substrate surfaces when plasma sprayed than do particles which are uncoated. The preferred metal coating layer is applied to a thickness of about 4 to 25 microns, most preferably about 5 microns. The preferred composition is nickel, although cobalt layers or layers which are an alloy based on nickel or cobalt may be used; conventional electrolytic or electroless processes are used to apply the coating layer.

Coating the ceramic particles with a thin layer of metal increases the capture efficiency of the ceramic particles in the abrasive layer during the spray process. Without the metal coating, layers containing more than about 12 volume percent ceramic are difficult to produce using the preferred LPPS process; with the metal coating, layers containing about 20 volume percent ceramic are readily fabricated. The metal coating on the ceramic particles produces other benefits. In particular, it decreases the tendency of the ceramic particles to shatter upon impact with the blade surface. It is also believed that some of the metal powder particles and metal coated ceramic particles agglomerate in the plasma spray stream, which reduces the tendency of the ceramic particles to bounce off the blade surface upon impact with such surface.

The metallic constituent which forms the matrix in the abrasive layer of this invention is oxidation resistant and has good high temperature strength, especially good creep resistance. The cyclic oxidation resistance of the matrix ought to be such that plasma sprayed layers of matrix material increase in weight (due to oxidation) by no more than about 3 milligrams per square centimeter ($mg/cm^2$) after 300 cycles at 1,150° C. (Cyclic oxidation tests include 50 minutes at 1,150° C. followed by 10 minutes of forced air cooling; one cycle is the combination of one 50 minute exposure at temperature followed by one 10 minute period of forced air cooling.) The creep rupture strength of the plasma sprayed matrix ought to be at least 250 hours at 1,095° C. and 3.4 megapascals (MPa). Insufficient matrix creep strength will result in failure of the abrasive layer during use. The use of LPPS techniques for applying the sprayed layer contributes significantly to the attainment of the aforementioned matrix strength. In particular, there are no oxide films present in the sprayed matrix of this invention. Such oxides are present in layers described by Eaton et al. (U.S. Pat. No. 4,386,112) and are the result of the use of conventional plasma spray techniques; oxides in the sprayed matrix result in products having poor creep strength.

Those skilled in the art recognize that numerous alloys exist which have good high temperature properties. For example, superalloys which are used to form gas turbine blades have excellent creep resistance but relatively poor oxidation resistance. Oxidation resistant coating alloys generally have poor creep strength. The prior art does not identify metal alloys having the combination of excellent cyclic oxidation resistance and excellent creep rupture strength. Three alloys have now been developed which have the oxidation resistance and alloy strength required for use as the matrix material in the abrasive layer of this invention. These compositions are set forth in Table I below. The composition range for such alloys is, on a weight percent basis, 0–10Co, 6–10Cr, 5–10Al, 4–10W, 2.25–8Ta, 0–1Hf, 0.1–0.2Y, 0.015–0.025C, 0–2Mo, 0–3Re, balance Ni. More specific composition ranges for the three alloys are, on a weight percent basis, 8–10 Cr, 5.8–7.8Al, 8–10W, 2.25–4.25Ta, 0.1–0.2Hf, 0.05–0.15Y, 0.01–0.03C, 0.5–1.5Mo, balance Ni; 8–10Cr, 8–10Al, 4–6Ta, 0.1–0.2Y, 0.01–0.03C, balance Ni; and 8–10Co, 6–8Cr, 5–7Al, 4–6W, 6–8Ta, 0.4–0.6Hf, 0.4–0.6Y, 0.01–0.03C, 1–3Re, balance Ni. Specific compositions for the three alloys are set forth below.

TABLE I

Matrix Material Compositions (Weight Percent)

| Alloy | Co | Cr | Al | W | Ta | Hf | Y | C | Mo | Re | Ni |
|---|---|---|---|---|---|---|---|---|---|---|---|
| 2 | 0 | 9 | 6.8 | 9 | 3.25 | 0.15 | 0.1 | 0.02 | 1 | 0 | bal |
| 4 | 0 | 9 | 9 | 0 | 5 | 0 | 0.15 | 0.02 | 0 | 0 | bal |
| 7 | 9 | 7 | 6 | 5 | 7 | 0.5 | 0.5 | 0.02 | 0 | 2 | bal |

Alloys of the type described above are formed into powder particles by conventional vacuum atomization or rapid solidification rate (RSR) processing. The powder particles should be free of any oxides or other contaminant. Processes such as those described in U.S. Pat. No. 4,355,057, which is incorporated by reference, will be useful for making powder; other processes are known to those skilled in the art. The nominal diameter of the powder used to fabricate the matrix ought to be in the range of 10 to 100 microns, preferably about 25 microns.

Abrasive layers fabricated in accordance with this invention have a combination of properties which have heretofore not been achieved. In particular, the ceramic constituent used in this invention is inert with respect to the matrix material it is incorporated in as well as the seal materials it rubs against. It also exhibits excellent abrasive characteristics even at high temperature uses. Ceramic materials used in prior art abrasive layers were either reactive with the matrix or seal materials or subject to property degradation when used at high temperatures. The ceramic constituent of this invention is also readily incorporated into an abrasive layer in amounts of about 20 volume percent by a plasma spray process. The alloys used to form the metal matrix according to this invention have excellent oxidation resistance and creep strength. Furthermore, as a result of the use of a nonoxidizing plasma spray environment, the abrasive layer is oxide free and is near theoretical density. The result of the combined aforementioned attributes is a low cost abrasive layer having better durability than layers described by the prior art.

The following examples will illustrate the features and advantages of this invention.

EXAMPLE I

Using a low pressure plasma spray system which included a model 132 nozzle made by Electroplasma, Inc. of Irvine, Calif., U.S.A. and adapted for the introduction of metal and ceramic particles into the plasma spray stream as described above, an abrasive layer is applied to the surface of a component fabricated from a nickel base superalloy gas turbine engine blade.

The blade is cleaned with typical grit blasting techniques, washed, and then inserted into the LPPS chamber. The chamber is pumped down to a pressure below at least about 150 microns of mercury. The chamber is then backfilled with argon or helium to a pressure below at least about 55 mm of mercury and the component is preheated to a temperature of at least about 840° C.–930° C. Dry, free flowing metal and ceramic powder particles are then introduced into the plasma stream, upstream of the nozzle end. The particles are carried by the plasma stream and deposited onto the blade surface; the ceramic particles are the aforementioned nickel coated Iscanite ® ceramic, which contained between 2 and 15 weight percent yttrium; the metal matrix is Alloy 2, whose composition is listed above. Key coating parameters are set forth below:

TABLE II

| Coating Parameters | |
|---|---|
| Plasma Gun Power: | 90 kw |
| Primary Arc Gas: | Argon |
| Primary Arc Gas Pressure: | 2.1 MPa |
| Secondary Arc Gas: | Helium |
| Secondary Arc Gas Pressure: | 1.5 MPa |
| Metal Powder Flow Rate: | 60 grams/minute |
| Ceramic Powder Flow Rate: | 60 grams/minute |
| Gun-Substrate Distance: | 30.5 centimeters |
| Gun Traverse Speed: | 17 centimeters/second |

The resulting layer is characterized by ceramic particulates uniformly distributed through the metal matrix, as shown in the Figure; the layer is free from inclusions and other such contamination, free from chips, extensive cracks and other imperfections. The layer is at least about 93 percent dense, free of oxides, and contains about 20 volume percent of ceramic particulate in the metal matrix. The thickness of the layer is about 250 microns. The abrasive layer successfully rubs against ceramic and metallic seals in tests which simulate the operating conditions in the turbine section of a modern gas turbine engine.

EXAMPLE II

Samples coated in accordance with the procedures identified in Example I are prepared, except that the $Si_3N_4$ abrasive particulates are not nickel coated as they are in Example I. During the plasma spray process, it is visually observed that many of the uncoated $Si_3N_4$ particulates bounce off of the blade surface they are sprayed upon. Metallographic examination of the sprayed specimens show that few of the ceramic particulates are present in the abrasive layer, and that of the particulates that are present in the layer, many of them shatter during the spray process. This Example therefore shows that the use of uncoated ceramic particulates yields marginally useful abrasive layers.

EXAMPLE III

Samples coated in accordance with the procedures identified in Example I are prepared, except that uncoated SiC particulates are utilized as the ceramic constituent rather than nickel coated $Si_3N_4$. After application of the abrasive layer, exposure at 1,095° C. in air indicates a severe chemical reaction between the SiC and the metal matrix, which degrades the integrity of the layer and precludes further use of the layer. The sample prepared in this example is representative of the prior art as described in U.S. Pat. No. 4,386,112 to Eaton et al. For comparison purposes, Example I samples are exposed at 1,095° C. in air for 500 hours, and show little or no chemical reaction between the $Si_3N_4$ and the metal matrix, and have excellent abrasive characteristics after the thermal treatment.

EXAMPLE IV

Samples are prepared by powder metallurgy and hot isostatic pressing techniques to compare the abrasive characteristics of several types of ceramics. The ceramics are nominally between 200 and 375 microns in diameter, and are present in a metal matrix in an amount which corresponds to approximately 20 volume percent of the sample. The metal matrix has the composition of Alloy 2, described above. The ceramics evaluated were: (1) $Si_3N_4$ doped with TiN, sold commercially as Walmet Quantum 5000; (2) $Si_3N_4$ doped with TiN, sold commercially as Ceratip A-65; (3) $Si_3N_4$, sold commercially as Sumitomo B-90; (4) $Al_2O_3$, sold commercially as Greenleaf 2001; (5) SiAlON, sold commercially as Kennemetal KYON 2000; (6) SiAlON, sold commercially as Sandvik CC680; and (7) yttria doped $Si_3N_4$, sold commercially as Iscanite ® ceramic. Tests to compare the cutting ability of the ceramics yielded the following results:

TABLE III

| Abrasive | Relative Cutting Ability |
|---|---|
| Walmet Quantum 5000 | Poor |
| Ceratip A-65 | Very Good |
| Sumitomo B-90 | Poor |
| Greenleaf 2001 | Good |
| Kennemetal Kyon 2000 | Very Good |
| Sandvik CC680 | Very Good |
| Iscanite Ceramic | Very Good |

Several tests are conducted to evaluate the performance of abrasive layers, fabricated in accordance with the procedures identified above, under conditions which are indicative of gas turbine engine operation. The layers rub against a seal member which is either the cobalt base casting having the Mar-M-509 composition (Martin Marietta Corporation; nominally 23.4Cr-10Ni-0.2Ti-0.6C-7W-3.5Ta-0.5Zr-balance cobalt) or a plasma sprayed, 80% dense, 202NS structure (Metco Inc.; 20 weight percent yttria stabilized zirconia). Performance is measured as the ratio between seal wear and abrasive layer wear (denoted VWR in Table IV below) and as the ratio between abrasive layer wear the combined amount of abrasive layer wear and seal wear (denoted W/I in the Table). The quantity identified as Incursion Rate in the Table is the distance per unit time (microns per second) at which the abrasive layer plunges into the seal member.

TABLE IV

Abradability Test Results

| Abrasive | Seal Member | Test Temperature (°C.) | Incursion Rate | VWR | W/I |
|---|---|---|---|---|---|
| Sandvik CC680 | Mar-M-509 | 980 | | 70 | 0.01 |
| Iscanite | Mar-M-509 | 980 | | 20 | 0.05 |
| KS 8000 | Mar-M-509 | 980 | | 8 | 4 |
| KY 2000 | Mar-M-509 | 980 | | 4 | 0.1 |
| Sandvik CC680 | 80% 202NS | 1,425 | | 2.5 | 0.5 |
| Iscanite | 80% 202NS | 1,425 | 2 | 0.3 | |
| Sandvik CC680 | 80% 202NS | 1,425 | | 0.9 | 0.5 |
| Iscanite | 80% 202NS | 1,425 | | 0.01 | 0.2 |
| Sandvik CC680 | 80% 202NS | 1,315 | 3 | (A) | 0.5 |
| Iscanite | 80% 202NS | 1,315 | 3 | (A) | 0.6 |
| Ceratip A-65 | 80% 202NS | 1,315 | 3 | (A) | 0.6 |
| SiC (B) | 80% 202NS | 1,315 | 3 | (A) | 0.8 |
| Iscanite | 80% 202NS | 1,425 | 250 | 14 | (A) |
| Sandvik CC680 (B) | 80% 202NS | 1,425 | 250 | 14 | (A) |
| SiC (B) | 80% 202NS | 1,425 | 250 | 11 | (A) |
| Sandvik CC680 | Mar-M-509 | 980 | 250 | 70 | (A) |
| Iscanite (B) | Mar-M-509 | 980 | 250 | 20 | (A) |
| SiC (B) | Mar-M-509 | 980 | 250 | 14 | (A) |
| Iscanite | Mar-M-509 | 980 | 25 | 48 | (A) |
| SiC (B) | Mar-M-509 | 980 | 25 | 0.7 | (A) |
| Sandvik CC680 | (C) | 980 | 250 | 200 | (A) |
| Iscanite | (D) | 980 | 250 | 22 | (A) |

Notes:
(A) Not measured
(B) Surface of abrasive layer was relief etched to reveal abrasives
(C) Plasma sprayed Ni—22Co—17Cr—12.5Al—0.6Y
(D) Plasma sprayed Alloy 2 (See Table I)

In tests to determine the oxidation behavior of the aforementioned ceramics during exposure in air at 1095° C. after 24 hours, the following results were obtained.

TABLE V

| Oxidation Behavior Measured at 1,095° C. | |
|---|---|
| Abrasive | % Weight Gain |
| Greenleaf 2001 | 0.1 |
| Iscanite Ceramic | 0.6 |
| Kennemetal Kyon 2000 | 0.8 |
| Ceratip A-65 | 7 |
| Sumitomo B-90 | 9 |
| Sandvik CC680 | 9 |
| Walmet Quantum 5000 | 12 |

These tests indicate that of the ceramics evaluated, only the Greenleaf, Kennemetal and Iscanite products have acceptable high temperature stability. These results, in combination with the rub tests, indicate that the Kennemetal $Si_3N_4$ product and the Iscanite SiAlON product have the best overall properties. In view of the behavior of ceramic particles during the plasma spray process, the particles should be coated with a 4–40 micron metal layer, preferably of nickel. When such ceramic particles are plasma sprayed along with the metal alloys described above using the procedures previously set forth, the resultant product is resistant to oxidation has high strength and abrasiveness during use at high temperatures, and is chemically stable.

From the foregoing description, one skilled in the art can ascertain the essential features of the invention, and can make various changes and modifications without departing from its spirit or scope, as set forth in the following claims.

We claim:

1. A method for applying an abrasive layer to the surface of a gas turbine engine blade, comprising the steps of generating a nonoxidizing plasma spray stream and directing the stream through the downstream end of a plasma spray nozzle and onto the blade surface; injecting ceramic particles and metal particles into the stream at a location upstream of said nozzle end; mixing and heating the particles in the stream, and then impacting the particles onto the blade surface to form said layer, wherein the ceramic particles are selected from the group of SiAlON and crystalline $Si_3N_4$ coated with a layer of nickel, cobalt or an alloy of nickel or cobalt, and the metal particles consist essentially of, by weight percent, 0–10Co, 6–10Cr, 5–10Al, 4–10W, 2.25–8Ta, 0–1Hf, 0.1–0.2Y, 0.015–0.025C, 0–2Mo, 0–3Re, balance Ni.

2. The method of claim 1, wherein the ceramic particles are coated with a layer of nickel or an alloy of nickel.

3. The method of claim 2, where the thickness of the nickel or nickel alloy coating is about 4–40 microns.

4. The method of claim 3, wherein the thickness of the nickel or nickel alloy coating is about 4–25 microns.

5. The method of claim 4, wherein the ceramic particles are $Si_3N_4$ containing about 2–15 weight percent yttria.

6. The method of claim 1, wherein the metal particles consist essentially of 9Cr-6.8W-3.25Ta-0.15Hf-0.1Y-0.02C-1Mo-balance nickel.

7. The method of claim 1, wherein the metal particles consist essentially of 9Cr-9Al-5Ta-0.15Y-0.02C-balance nickel.

8. The method of claim 1, wherein the metal particles consist essentially of 9Co-7Cr-6Al-5W-7Ta-0.5Hf-0.5Y-0.02C-2Re-balance nickel.

9. A method for applying an abrasive layer to the surface of a gas turbine engine blade made of a nickel base superalloy, comprising the steps of generating a plasma spray stream within a low pressure plasma chamber backfilled with an inert gas to a pressure below at least about 55 mm of mercury; directing the stream through the downstream end of a plasma spray nozzle within the chamber; injecting ceramic particles and metal particles into the stream at a location upstream of said nozzle end; mixing and heating the particles in the stream, and then impacting the particles onto the blade surface to form said layer, wherein the ceramic particles are crystalline $Si_3N_4$ having a nominal diameter between 50 and 175 microns and are coated with a layer of nickel 4–20 microns thick, and the metal particles consist essentially of, on a weight percent basis, 0–10Co, 6–10Cr, 5–10Al, 4–10W, 2.25–8Ta, 0–1Hf, 0.1–0.2Y, 0.015–0.025C, 0–2Mo, 0–3Re, balance nickel.

10. A gas turbine engine blade having on its surface an abrasive layer consisting essentially of ceramic particles in a metal matrix, the ceramic particles selected from the group of SiAlON and crystalline $Si_3N_4$ and the metal matrix consisting essentially of, on a weight percent basis, 0–10Co, 6–10Cr, 5–10Al, 4–10W, 2.25–8Ta, 0–1Hf, 0.1–0.2Y, 0.015–0.025C, 0–2Mo, 0–3Re, balance nickel, wherein the abrasive layer is 125–375 microns thick and contains between 5–40 volume percent ceramic, and the matrix is substantially free of oxides.

11. The blade of claim 10, wherein the ceramic particles are $Si_3N_4$ which contain 2–15 weight percent yttria.

12. The blade of claim 10, wherein the ceramic particles are about 50–175 microns in diameter and are coated with a layer of nickel or cobalt 4–40 microns thick.

13. The blade of claim 10, wherein the matrix consists essentially of 9Cr-6.8Al-9W-3.25Ta-0.15Hf-0.1Y-0.02C-1Mo-balance nickel.

14. The blade of claim 10, wherein the layer contains about 20 volume percent ceramic.

* * * * *